US012584079B2

(12) United States Patent
Sanchez et al.

(10) Patent No.: US 12,584,079 B2
(45) Date of Patent: Mar. 24, 2026

(54) FABRIC SOFTENING COMPOSITIONS

(71) Applicant: Colgate-Palmolive Company, New York, NY (US)

(72) Inventors: Sandra Paola Sanchez, Mexico City (MX); Raul Arellano Maldonado, Mexico City (MX); Carla Lopez, Mexico City (MX); Marcela Hernandez, San Jose Iturbide (MX)

(73) Assignee: Colgate-Palmolive Company, New York, NY (US)

( * ) Notice: Subject to any disclaimer, the term of this patent is extended or adjusted under 35 U.S.C. 154(b) by 477 days.

(21) Appl. No.: 18/006,675

(22) PCT Filed: Jul. 29, 2021

(86) PCT No.: PCT/US2021/043684
§ 371 (c)(1),
(2) Date: Jan. 24, 2023

(87) PCT Pub. No.: WO2022/026694
PCT Pub. Date: Feb. 3, 2022

(65) Prior Publication Data

US 2023/0287303 A1 Sep. 14, 2023

Related U.S. Application Data

(60) Provisional application No. 63/059,667, filed on Jul. 31, 2020.

(51) Int. Cl.

| | |
|---|---|
| ***C11D 3/00*** | (2006.01) |
| ***C11D 3/20*** | (2006.01) |
| ***C11D 3/22*** | (2006.01) |
| ***C11D 3/36*** | (2006.01) |
| ***C11D 3/382*** | (2006.01) |

(52) U.S. Cl.
CPC ............ *C11D 3/001* (2013.01); *C11D 3/2065* (2013.01); *C11D 3/2086* (2013.01); *C11D 3/2093* (2013.01); *C11D 3/225* (2013.01); *C11D 3/361* (2013.01); *C11D 3/382* (2013.01)

(58) Field of Classification Search
CPC ..... C11D 3/001; C11D 3/2065; C11D 3/2086; C11D 3/2093; C11D 3/225; C11D 3/361; C11D 3/382; C11D 3/2044
USPC .......................................................... 510/515
See application file for complete search history.

(56) References Cited

U.S. PATENT DOCUMENTS

| | | | | |
|---|---|---|---|---|
| 5,389,676 | A | 2/1995 | Michaels | |
| 5,668,094 | A | 9/1997 | Bacon et al. | |
| 8,048,920 | B2 * | 11/2011 | Joerger | A23L 33/10 514/552 |
| 10,377,967 | B2 | 8/2019 | Schymitzek et al. | |
| 10,815,450 | B2 | 10/2020 | Saveyn et al. | |
| 2003/0220217 | A1 * | 11/2003 | McHattie | C11D 3/0015 510/330 |
| 2004/0058848 | A1 * | 3/2004 | Grainger | C11D 1/645 510/515 |
| 2004/0138089 | A1 | 7/2004 | Wachter et al. | |
| 2005/0026808 | A1 * | 2/2005 | Mohammadi | C11D 1/835 510/515 |
| 2006/0134047 | A1 | 6/2006 | Bakeev et al. | |
| 2006/0154847 | A1 | 7/2006 | Schmid et al. | |
| 2011/0081309 | A1 | 4/2011 | Fevola et al. | |
| 2011/0082066 | A1 | 4/2011 | Wrubbel et al. | |
| 2011/0300085 | A1 | 12/2011 | Courbon et al. | |
| 2017/0009184 | A1 | 1/2017 | Schubert et al. | |
| 2020/0169847 | A1 * | 5/2020 | Hanada | G01S 5/02585 |

FOREIGN PATENT DOCUMENTS

| | | | | |
|---|---|---|---|---|
| CN | 108431192 | | 8/2018 | |
| EP | 0360392 | A2 * | 3/1990 | C11D 1/12 |
| EP | 1152051 | A2 * | 11/2001 | C11D 3/2093 |
| EP | 3383987 | | 10/2018 | |

OTHER PUBLICATIONS

International Search Report and the Written Opinion of the International Searching Authority issued in International Application PCT/US2021/043684 mailed Nov. 11, 2021.

* cited by examiner

*Primary Examiner* — Eisa B Elhilo

(57) ABSTRACT

Described herein are fabric softening compositions novel fabric softeners and conditioners that comprises a formula with a polyhydric alcohol (e.g., glycerin) and a nonionic cellulose ether (e.g., hydroxyethyl cellulose (HEC)) backbone, and a plant-based softening agent comprising one or more agents selected from: a plasticizer, wherein the plasticizer is further selected from the group consisting of isopropyl myristate, isopropyl palmitate, isodecyl neopentanoate, isodecyl oleate, and diisopropyl adipate, or a partially hydrolyzed plant protein. Methods of manufacturing are also contemplated.

17 Claims, No Drawings

FABRIC SOFTENING COMPOSITIONS

FIELD OF THE INVENTION

The invention contemplates novel fabric softeners and conditioners that incorporate plant and vegetal based sources. The formulations described herein comprise plant and vegetal based sources, but can still perform at parity in certain respects, such as transparency and softening, to commercial fabric softener that utilize synthetic ingredients. In one aspect, the invention comprises a formula with a polyhydric alcohol (e.g., glycerin) a nonionic cellulose ether (e.g., hydroxyethyl cellulose (HEC)) backbone, and a plasticizer (e.g., isopropyl palmitate or a cationic wheat protein).

BACKGROUND

Fabric softeners are used to make the clothes soft, preserve color, and give them a long-lasting fragrance. They are widely used among households, laundry services, textile industry, hospitality industry, and others. The main active ingredients in a conventional fabric softener are the fatty acid esterquats, which are cationic surfactants commonly known in the market as TEA-Esterquats. The fatty components used to produce these cationic actives can be both, animal or vegetable origin, being the animal the most commonly used. These actives improve the feeling of soft touch in most fabrics and can control static electricity in the textile tissues.

In recent years, the changes in preferences of consumers have been driven by the development of new and innovative formulations in the fabric softeners market. One of the most important consumer needs to address is the demand for more eco-friendly products. Consumers in the marketplace are now looking for more sustainable products, and there is increased interest in products which include ingredients that are derived from plant and vegetal sources. However, for any plant-based fabric softener, the challenge is finding new actives and new combinations of ingredients that provide the same or similar appearance and performance benefits that consumers expect from products that incorporate with typically more synthetic ingredients. For example, one of the challenges can be finding actives and ingredients which result in a clear and transparent final product.

Accordingly, because of new consumer preferences and demands, there is a need for new plant-based fabric softeners that can offer the same quality and performance of traditional non plant-based softeners which are currently on the market.

BRIEF SUMMARY

In one aspect, the disclosure contemplates novel fabric softeners and conditioners that incorporate plant and vegetal based sources and, beneficially, provide a clear and transparent product. For example, the formulations described herein comprise plant and vegetal based sources, but can still perform at parity in certain respects to commercial fabric softener that utilize synthetic ingredients, but still provide a clear and transparent appearance. In one aspect, the disclosure comprises a formula with a polyhydric alcohol (e.g., glycerin) and a nonionic cellulose ether (e.g., hydroxyethyl cellulose (HEC)) backbone. In terms of performance, it is believed that the formulations described here can surprisingly provide softness to clothes during the rinse cycle of washing, e.g., when conducted at warm and cold temperatures, 40° C. and 20° C. respectively. And, with respect to softening ability, in at least one aspect, the softeners described herein can soften at parity with market products that employ synthetic ingredients.

In one aspect, the plant-based softener formulas use a backbone that comprises a blend of a polyhydric alcohol (e.g., glycerin), a nonionic cellulose ether (e.g., HEC), and a plant based softening agent comprising one or more selected from a plasticizer comprising isopropyl palmitate or a cationic wheat protein.

In one aspect, the plant-based softener formulas use a backbone that comprises a blend of a polyhydric alcohol (e.g., glycerin), a nonionic cellulose ether (e.g., HEC), a plasticizer comprising isopropyl palmitate or cationic wheat protein, and further uses decan-1-ol surfactant for fragrance emulsification. In this aspect, decan-1-ol is believed to provide translucent appearance to the product.

In yet another aspect, in order to maintain acceptable preservation, the formulas maintain a low pH (2-3.5) with the addition of an organic acid (e.g., lactic acid and/or etidronic acid).

In still another aspect, the invention contemplates processing steps required for the manufacturing of the novel plant-based formulations described herein.

In one aspect the invention contemplates a fabric softener composition (Composition 1.0). Composition 1.0 is a fabric softening composition comprising:

- A natural thickener comprising a nonionic cellulose ether (e.g., HEC)
- A polyhydric alcohol (e.g., glycerin); and
- A plant-based softening agent comprising one or more agents selected from:
  - a plasticizer, wherein the plasticizer is further selected from the group consisting of isopropyl myristate, isopropyl palmitate, isodecyl neopentanoate, isodecyl oleate, and diisopropyl adipate, or
  - a hydrolyzed plant protein (e.g., partially hydrolyzed plant protein) (e.g., cationic wheat protein).

For example, in another aspect the fabric softening composition of Composition 1.0 includes the following aspects:

- 1.1 The fabric softener composition of 1.0, wherein the nonionic cellulose ether is methyl cellulose ether, hydroxyethyl cellulose ether or hydroxypropyl cellulose ether (e.g., from 0.1% to 1.0% by wt of the total composition).
- 1.2 The fabric softener composition of 1.0 or 1.1, wherein the nonionic cellulose ether is selected from: hydroxyethyl cellulose (HEC), hydroxypropyl cellulose (HPC), methyl cellulose, hydroxypropyl methyl cellulose; ethyl hydroxyethyl cellulose and methyl hydroxyethyl cellulose.
- 1.3 The fabric softener composition of any of 1.0-1.2, wherein the nonionic cellulose ether is hydroxyethyl cellulose (HEC).
- 1.4 Any of the preceding fabric softener compositions, wherein the nonionic cellulose ether is in an amount of from 0.1% to 1.0% by wt of the total composition. ((e.g., from 0.1% to 1.0% by wt of HEC) (e.g., about 0.4% HEC))
- 1.5 Any of the preceding fabric softening compositions, wherein the polyhydric alcohol is selected from: ethylene glycol, glycerin (glycerol), erythritol, threitol, arabitol, xylitol, ribitol, mannitol, sorbitol, galactitol, fucitol, iditol, inositol, volemitol, isomalt, maltitol, lactitol, maltotriitol, maltotetraitol, polyglycitol
- 1.6 The fabric softening composition of 1.5, wherein the polyhydric alcohol is glycerin (e.g., 1.0%-2.0% by wt) (e.g., about 1.5% by wt.).

1.7 The fabric softening composition of 1.5 or 1.6, wherein the polyhydric alcohol is present in an amount from 0.5%-3.0% by wt of the total composition (e.g., 1.0%-2.0% by wt of glycerin) (e.g., about 1.5% by wt of glycerin).

1.8 The fabric softening composition of any of the preceding compositions, wherein the fabric softener further comprises an organic acid (e.g., lactic acid or phosphonic acid);

1.9 The fabric softener of any of the preceding compositions, wherein the organic acid is selected from lactic acid and phosphonic acid.

1.10 The fabric softener of 1.9, wherein the organic acid (e.g., lactic acid) is present in an amount from 0.05% to 0.5% by wt. of the total composition (e.g., about 0.3% by wt.)

1.11 The fabric softener of 1.10, wherein the organic acid is lactic acid (e.g., lactic acid from 0.05% to 0.5%) (e.g., about 0.1% by wt.) (e.g., about 0.3% by wt.).

1.12 Any of the preceding fabric softener compositions further comprising a phosphonic chelating agent (e.g., etidronic acid)

1.13 The fabric softener composition of 1.12, wherein the phosphonic chelating agent is etidronic acid.

1.14 The fabric composition of 1.13, wherein the etidronic acid is present in an amount from 0.05%-0.3% by wt. of the total composition (e.g., about 0.1% by wt of the total composition).

1.15 The fabric softener composition of any of the preceding claims, wherein the plasticizer is isopropyl palmitate (e.g., in an amount from 0.05%-0.5% by wt of the total composition) (e.g., about 0.1% by wt.).

1.16 The fabric softener composition of any of 1.15, wherein the plasticizer is present in an amount from 0.05%-0.2% by wt of the total composition (e.g., about 0.1% by wt.)

1.17 The fabric softener composition of any of 1.0-1.14, wherein the hydrolyzed plant protein is obtained from grains of the family Poaceae, e.g., is partially hydrolyzed maize (corn), wheat, rice, barley, oat, or millet protein.

1.18 The fabric softener composition of any of 1.0-1.14, or 1.17, wherein the hydrolyzed plant protein is partially hydrolyzed wheat protein or hydrolyzed rice protein.

1.19 The fabric softener composition of any of 1.0-1.14, or 1.17-1.18, wherein the hydrolyzed plant protein is obtained from wheat, rice, almond, potato, pea, soya or combinations thereof.

1.20 The fabric softener composition of any of 1.0-1.14, or 1.17-1.19, wherein the hydrolyzed plant protein is partially hydrolyzed wheat protein which is substantially free of gluten.

1.21 The fabric softener composition of any of 1.0-1.14, or 1.17-1.19, wherein the partially hydrolyzed plant protein is partially hydrolyzed wheat protein.

1.22 The fabric softener composition of any of 1.0-1.14, or 1.17-1.21, wherein the hydrolyzed plant protein is selected from: hydrolyzed wheat gluten, almond flour hydrolysate, wheat protein fatty acid condensates (e.g., sodium cocoyl hydrolyzed wheat protein), and cationic wheat protein hydrolysates (e.g., laurdimonium hydroxypropyl hydrolyzed wheat protein), hydrolyzed soybean protein, hydolyzed pea protein, hydrolyzed rice protein, hydrolyzed almond flour, and combinations thereof.

1.23 The fabric softener composition of any of 1.0-1.14, or 1.17-1.22, wherein the hydrolyzed plant protein is cationic wheat protein (e.g., from 0.1%-1% by wt. of the total composition) (e.g., about 0.25% by wt. of the total composition) 1.24 The fabric softener composition of any of 1.0-1.14, or 1.17-1.23, wherein the hydrolyzed plant protein is present in an amount of from 0.1%-0.5% by wt of the total composition (e.g., about 0.25% by wt).

1.25 Any of the preceding fabric softener compositions, wherein the fabric softener comprises:

hydroxyethyl cellulose (e.g., from 0.1%-1.0% by wt. of the total composition) (e.g., about 0.4% by wt. of the total composition)

glycerin (e.g., 1.0%-2.0% by wt of glycerin) (e.g., about 1.5% by wt of glycerin); and isopropyl palmitate (e.g., in an amount from 0.05%-0.2% by wt of the total composition) (e.g., about 0.1% by wt.).

1.26 Any of the fabric softener compositions of 1.0-1.26, wherein the fabric softener comprises:

hydroxyethyl cellulose (e.g., from 0.1%-1.0% by wt. of the total composition) (e.g., about 0.4% by wt. of the total composition);

glycerin (e.g., 1.0%-2.0% by wt of glycerin) (e.g., about 1.5% by wt of glycerin); and cationic wheat protein (e.g., from 0.1%-0.5% by wt. of the total composition) (e.g., about 0.25% by wt. of the total composition).

1.27 Any of the fabric softener compositions of 1.0-1.26, wherein the fabric softener comprises hydroxyethyl cellulose (e.g., from 0.1%-1.0% by wt. of the total composition) (e.g., about 0.4% by wt. of the total composition)

glycerin (e.g., 1.0%-2.0% by wt of glycerin) (e.g., about 1.5% by wt of glycerin); and isopropyl palmitate (e.g., in an amount from 0.05%-0.2% by wt of the total composition) (e.g., about 0.1% by wt.).

etidronic acid present in an amount from 0.05%-0.4% by wt. of the total composition (e.g., about 0.1% by wt of the total composition) (e.g., about 0.15% by wt of the total composition) (e.g., about 0.2% by wt of the total composition) (e.g., about 0.3% by wt of the total composition); and water 1.28 Any of the fabric softener compositions of 1.0-1.26, wherein the fabric softener comprises:

hydroxyethyl cellulose (e.g., from 0.1%-1.0% by wt. of the total composition) (e.g., about 0.4% by wt. of the total composition);

glycerin (e.g., 1.0%-2.0% by wt of glycerin) (e.g., about 1.5% by wt of glycerin);

a cationic wheat protein (e.g., from 0.1%-0.5% by wt of the total composition) (e.g., about 0.25% by wt. of the total composition).

etidronic acid present in an amount from 0.05%-0.4% by wt. of the total composition (e.g., about 0.1% by wt of the total composition) (e.g., about 0.15% by wt of the total composition) (e.g., about 0.2% by wt of the total composition) (e.g., about 0.3% by wt of the total composition); and water 1.29 Any of the preceding fabric softener composition further comprising a fragrance emulsifier.

1.30 The fabric softener composition of 1.31, wherein the fragrance emulsifier is a straight chain fatty alcohol.

1.31 The fabric softener composition of 1.31, wherein the straight chain fatty alcohol is decan-1-ol.

1.32 The fabric softener composition of any of the preceding, wherein the plasticizer comprises isopropyl palmitate and is free or substantially free of a cationic wheat protein.

1.33 The fabric softener composition of any of 1.0-1.31, wherein the plasticizer comprises a cationic wheat protein and is free or substantially free of isopropyl palmitate.

1.34 The fabric softener composition of any of any of the preceding compositions, wherein the composition further comprises a quaternary ammonium compound.

1.35 The fabric softener composition of 1.34, wherein the quaternary ammonium compound is an esterquat.

1.36 The fabric softener composition of 1.34, wherein the esterquat is selected from a: monoesterquat, diesterquat, triesterquat, and combinations thereof.

1.37 The fabric softener composition of 1.34, wherein the quaternary ammonium compound is a polyquaternium compound.

1.38 The fabric softener composition of 1.37, polyquaternium compound selected from: polyquaternium-1, polyquaternium-2, polyquaternium-3, polyquaternium-4, polyquaternium-5, polyquaternium-6, polyquaternium-7, polyquaternium-8, polyquaternium-9, polyquaternium-10, polyquaternium-11, polyquaternium-12, polyquaternium-13, polyquaternium-14, polyquaternium-15, polyquaternium-16, polyquaternium-17, polyquaternium-18, polyquaternium-19, polyquaternium-20, polyquaternium-21, polyquaternium-22, polyquaternium-23, polyquaternium-24, polyquaternium-25, polyquaternium-26, polyquaternium-27, and polyquaternium-28.

1.39 The fabric softener composition of 1.38, wherein the polyquaternium compound is polyquaternium-7.

1.40 The fabric softener composition of any of the preceding compositions, further comprising a fragrance (e.g., encapsulated fragrance) (e.g., fragrance capsules).

1.41 The fabric softener composition of any of the preceding compositions, wherein the cloud point evaluation at cold temperatures results in clouding at temperatures as low as between −1° C. to −4.5° C. (e.g., regardless of the presence of a fragrance).

1.42 The fabric softener composition of any of the preceding compositions, wherein suspended particles are not visible.

1.43 The fabric softener composition of any of the preceding compositions, wherein the viscosity of the softener is between 70-180 cps.

1.44 The fabric softener composition of any of the preceding compositions, wherein the softener has a phabrometer score above 3.0 (e.g., between 3.0-4.0).

1.45 The fabric softener composition of any of the preceding compositions, wherein the NTUs (Nephelometric Turbidity Units) is between 1.8-3.5 (e.g., between 1.95-3.45).

1.46 The fabric softener composition of any of the preceding compositions comprising lactic acid and etidronic acid (e.g., from 0.05%-0.5% lactic acid and 0.05%-0.5% etidronic acid) (e.g., about 0.3% lactic acid and about 0.15% etidronic acid) (e.g., about 0.3% lactic acid and about 0.2% etidronic acid) (e.g., about 0.3% lactic acid and about 0.3% etidronic acid).

1.47 The fabric softener composition of any of the preceding compositions comprising lactic acid and capryl glycol (e.g., from 0.05%-0.5% lactic acid and 0.05%-0.5% capryl glycol) (e.g., about 0.3% lactic acid and 0.3% capryl glycol).

1.48 The fabric softener composition of any of the preceding compositions, wherein the fabric softener is free or substantially free of a quaternary ammonium compound.

The fabric softener composition of any of the preceding compositions, further comprising a synthetic preservative (e.g., an isothiazolinone) (e.g., an isothiazolinone mixture of OIT/MIT/CIT). In yet another aspect, the invention contemplates a method of manufacturing any fabric softeners of Composition 1.0, et seq. In one aspect, the method of manufacturing. In this aspect, any fragrances added to the fabric softener demonstrate acceptable dispersability when part of the addition in the manufacturing process.

In one aspect, the manufacturing of the fabric softener Composition 1.0 et seq, can be done using DI water between 20 to 50° C. in one or 2 parts of water. One part of water at room temperature (29-31° C.) is the most recommended process. The agitation for acceptable incorporation of the ingredients can be set between 100 to 400 rpm. The order of addition of ingredients may have an impact in the final appearance of the product, generating turbidity or transparency. In one aspect, the fabric softener Composition 1.0 et seq., can be made by first adding glycerin and hydroxyethylcellulose to the total amount of water. Caustic soda can then be added to achieve a basic pH, helping to have a good hydration of the hydroxyethylcellulose, which, in turn, provides good consistency to the product. In one aspect, lactic and etidronic acid can be subsequently added, which may help to decrease the pH and preserve the product. In one aspect, a pre-mix of fragrance with decanol and isopropylpalmitate can be added to the total batch. The addition of the premix, can help to maintain good transparency in the final product. Color and antifoam may be added as a final step. In one particular aspect, agitation is maintained between 100 to 400 rpms during all of the manufacturing steps.

As used herein, the term "fabric softener" or "fabric softener composition" or "fabric conditioner" refers to a product added to the wash or rinse cycle of a laundry process for the express or primary purpose of conferring one or more conditioning benefits. Fabric conditioning compositions employed according to the invention may be provided in liquid and/or solid formulations. For solid formulations, fabric conditioning compositions, e.g., e.g., any of Compositions 1.0 et seq, can take the form of a dilutable fabric conditioner, that may be a molded solid, a tablet, a powder, a block, a bar, or any other solid fabric conditioner form known to those skilled in the art.

For either solid or liquid formulations, the fabric conditioning compositions can also take the form of a fabric softener intended to be applied to articles without substantial dilution and sold as any form known to those skilled in the art as a potential medium for delivering such fabric softeners to the industrial and institutional market. For example, powders for direct application to fabrics are also considered within the scope of this disclosure. Such examples, however, are provided for illustrative purposes and are not intended to limit the scope of this invention.

As used herein, "substantially free" of a material may refer to a composition where the material is present in an amount of less than 0.1 weight %, less than 0.05 weight %, less than 0.01 weight %, less than 0.005 weight %, less than 0.001 weight %, or less than 0.0001 weight % based on a total weight of the composition.

DETAILED DESCRIPTION

Hydrolyzed Plant Proteins

In at least one aspect, the Compositions of 1.0 et seq, comprise hydrolyzed plant proteins are proteins from plants, for example, from edible plant parts, for example from wheat, rice, almond, potato, pea, soya or combinations thereof, e.g., from cereal grains such as maize, wheat, rice, barley, oats, and millet. In particular embodiments, the hydrolyzed plant proteins are from wheat or rice.

Hydrolyzed wheat protein is typically obtained by enzymatically hydrolyzing wheat protein using endoproteases and exoproteases. Hydrolyzed wheat protein may also be obtained through acid or alkaline hydrolysis. Methods of preparing hydrolyzed wheat protein would be known to the person skilled in the art of protein chemistry. However, hydrolyzed wheat protein is also commercially available as Gluadin® W20, Gluadin W40 from BASF, and as Wheatpro® from IKEDA or COLTIDE HQS from CRODA. Gluadin W20 is a partial hydrolysate obtained through enzymatic hydrolysis of wheat gluten. It contains at least 20.0% of dry substance. Gluadin W40 is a partial hydrolysate obtained through enzymatic hydrolysis of wheat gluten. It contains at least 40.0% of dry substance.

In one aspect, the fabric composition of 1.0 et seq., incorporate the cationic wheat protein with a commercial name Gluadin® WQ PP. In this aspect, Gluadin® WQ PP is a quaternized protein hydrolyzed wheat protein in which the care effects of the cationic substances are combined with the positive dermatological effects of the protein derivatives. In one aspect, the typical concentration for use is 0.25-5% by wt of the total fabric softening composition. The chemical composition is based on quaternized wheat protein hydrolysate from vegetal wheat gluten (INCI: Laurdimonium Hydroxypropyl Hydrolyzed Wheat Protein), which may also be known as Protein hydrolyzates, wheat germ, [3-(dodecyldimethylammonio)-2-hydroxypropyl], chlorides.

In another embodiment, the hydrolyzed plant protein is made from processed wheat protein which is free of gluten.

The hydrolyzed plant protein used in the compositions and methods herein is not fully hydrolyzed and thus is sometimes referred to as "partially hydrolyzed" to emphasize this point. By "partially hydrolyzed" it is meant that at least some, but not all, of the peptide bonds are hydrolyzed.

In some embodiments, the hydrolyzed plant protein is present in the composition in an amount of from 0.01 weight % to 3 weight % by total weight of the composition. In some embodiments, the hydrolyzed plant protein is present in the composition in an amount of from 0.1 weight % to 3 weight %, or from 0.1 weight % to 2 weight %, or from 0.1 weight % to 1 weight % by total weight of the composition. In other embodiments, the hydrolyzed plant protein is present in the composition in an amount of from 0.05 weight % to 1 weight %, or from 0.1 weight % to 0.5 by total weight of the composition In further embodiments, the hydrolyzed plant protein is present in the composition in an amount of from 0.5 weight % to 3 weight %, or from 0.5 weight % to 2 weight %, or from 0.5 weight % to 1 weight % by total weight of the composition. In still further embodiments, the hydrolyzed plant protein is present in the composition in an amount of from 1 weight % to 3 weight %, or from 1 weight % to 2 weight % by total weight of the composition.

In one arrangement, the compositions of the present invention comprise both hydrolyzed wheat protein and hydrolyzed rice protein. In this arrangement, the hydrolyzed wheat protein and the hydrolyzed rice protein may be present in the composition in the amounts defined above. Optionally, the total amount of hydrolyzed wheat protein and hydrolyzed rice protein in the composition is from 0.1 weight % to 3 weight %, or from 0.1 weight % to 2 weight %, or from 0.1 weight % to 1 weight %, or from 0.1 weight % to 0.5 weight % by total weight of the composition. In some embodiments, the total amount of hydrolyzed wheat protein and hydrolyzed rice protein in the composition is from 1 weight % to 3 weight %, or from 1 weight % to 2 weight %, by total weight of the composition.

Fabric Softening Compositions

In some embodiments, the fabric softening composition of Composition 1.0 et seq, further comprises a quaternary ammonium compound. Wherein, in some aspects, the fabric softening composition of Composition 1.0 et seq further comprises a biodegradable fatty acid quaternary ammonium compound known as an esterquat. As used herein, "esterquats" can be quaternary ammonium compounds having two long (C(16)-C(18)) fatty acid chains with 2 weak ester linkages. In some embodiments, the quaternary ammonium compound imparts fabric softening properties to the FS composition. The fabric care composition of Composition 1.0 et seq, includes one or more fabric softening agents. In certain embodiments, the fabric softening agent is a quaternary ammonium compound selected from among esterquats, imidazolium quats, difatty diamide ammonium methyl sulfate, ditallow dimethyl ammonium chloride, bis-(2-hydroxypropyl)-dim.ethylammonium metbylsulphate fatty acid ester, 1,2-di(acyloxy)-3-trimethylammoniopropane chloride, N, N-bis(stearoyl-oxy-ethyl) N.N-dimethyl ammonium chloride, N,N-bis(tallowoyl-oxy-ethyl) N.N-dimethyl ammonium chloride, N,N-bis(stearoyl-oxy-ethyl)N-(2 hydroxyethyi)N-methyl ammonium methylsulfate, 1,2 di (stearoyl-oxy) 3 trimethyl ammoniumpropane chloride, dicanoladimethylammonium chloride, di(hard)tallowdimethylammonium chloride dicanoladimethylammonium methylsulfate, 1-methyl-1-stearoylamidoethyl-2-stearoylimidazolinium methylsulfate, 1-tallowylamidoemyl-2-tallowylimidazoline, dipalmethyl hydroxyethylammoinum methosulfate and mixtures thereof.

In some embodiments, the quaternary ammonium compound is derived from the reaction of an alkanol amine and a fatty acid derivative, followed by quaternization (complete or partial) of the product. In some embodiments, the quaternary ammonium compound is a dialkyl ester of triethanol ammonium methyl sulphate. In some embodiments, the quaternary ammonium compound comprises a compound having the structure of formula I:

I

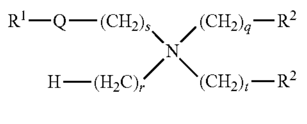

wherein:

Q is a carboxyl group having the structure selected from —OCO—; and —COO;

$R^1$ is an aliphatic hydrocarbon group having from 8 to 22 carbon atoms, preferably a $C_{10}$ to $C_{20}$ alkyl group;

$R^2$ is selected from Q—$R^1$ and —OH;

q, r, s, t each independently represent a number from 1 to 3; and $X^{-a}$ is an anion having a valence "a". Preferred anion materials include chloride, bromide, and methyl sulfate.

In some embodiments, the present invention provides a quaternary ammonium compound of formula I, wherein one of the $R^2$ groups is Q—$R^1$. Further embodiments provide a quaternary ammonium compound of formula I, wherein both $R^2$ groups are Q—$R^1$. Still further embodiments provide a quaternary compound of formula I, wherein both $R^2$ groups are —OH.

In some embodiments, the quaternary ammonium compound comprises a mixture of monoesters, diesters, and triesters. In some embodiments, the normalized percentage of monoester compound in said quaternary ammonium compound is from 28% to 34%; the normalized percentage of diester compound is from 55% to 62%, and the normalized percentage of triester compound is from 8% to 14%, all percentages being by weight.

In some embodiments, the quaternary ammonium compound is an oligomeric esterquat, obtainable by reaction of an alkanol amine with (i) a polycarboxylic acid; and (ii) a fatty alcohol or a fatty acid or a mixture of fatty alcohols and fatty acids, followed by partial quaternization, thereby forming a mixture of oligomeric ester amines and esterquat. In some embodiments, the alkanol amine is triethanol amine. In some embodiments, the carboxylic acid is a polycarboxylic acid. In other embodiments the carboxylic acid is a dicarboxylic acid. An example of such an esterquat material is the esterquats commercially available from Kao Chemicals or Stepan Company.

In one aspect, the esterquat may be produced by reacting about 1.65 (1.5 to 1.75) moles of fatty acid methyl ester with one mole of alkanol amine followed by quaternization with dimethyl sulfate (further details on this preparation method are disclosed in U.S. Pat. No. 3,915,867, the contents of which are incorporated herein by reference). Using this ratio controls the amount of each of monoesterquat, diesterquat, and triesterquat in the composition. In certain embodiments, the alkanol amine comprises triethanolamine. In certain embodiments, it is desirable to increase the amount of diesterquat and minimize the amount of triesterquat to increase the softening capabilities of the composition. By selecting a ratio of about 1.65, the triesterquat can be minimized while increasing the monoesterquat.

Monoesterquat is more soluble in water than triesterquat. Depending on the AI, more or less monoesterquat is desired. At higher AI levels (usually at least 7%), more monoesterquat as compared to triesterquat is desired so that the esterquat is more soluble in the water so that the esterquat can be delivered to fabric during use. At lower AI levels (usually up to 3%), less monoesterquat is desired because during use, it is desired for the esterquat to leave solution and deposit on fabric to effect fabric softening. Depending on the AI, the amount of monoesterquat and tri esterquat are adjusted to balance solubility and delivery of the esterquat.

In certain aspects, the reaction products are 50-65 weight % diesterquat, 20-40 weight % monoester, and 25 weight % or less trimester. In other embodiments, the amount of diesterquat is 52-60, 53-58, or 53-55 weight %. In other embodiments, the amount of monoesterquat is 30-40 or 35-40 weight %. In other embodiments, the amount of triesterquat is 1-12 or 8-1 1 weight %.

The percentages, by weight, of mono, di, and tri esterquats, as described above are determined by the quantitative analytical method described in the publication "Characterisation of quatemized triethanoiamine esters (esterquats) by HPLC, HRCGC and NMR" A. J. Wilkes, C. Jacobs, G. Walraven and J. M. Talbot—Colgate Palmolive R&D Inc.—4th world Surfactants Congress, Barceione, 3-7 VI 1996, page 382, which is incorporated herein by reference. The percentages, by weight, of the mono, di and tri esterquats measured on dried samples are normalized on the basis of 100%. The normalization is required due to the presence of 10% to 15%, by weight, of non-quaternized species, such as ester amines and free fatty acids. Accordingly, the normalized weight percentages refer to the pure esterquat component of the raw material. In other words, for the weight % of each of monoesterquat, diesterquat, and triesterquat, the weight % is based on the total amount of monoesterquat, diesterquat, and triesterquat in the composition.

In certain embodiments, the percentage of saturated fatty acids based on the total weight of fatty acids is 45 to 75%. Esterquat compositions using this percentage of saturated fatty acids do not suffer from the processing drawbacks of 100% saturated materials. When used in fabric softening, these compositions provide good consumer perceived fabric softness while retaining good fragrance delivery. In other embodiments, the amount is at least 50, 55, 60, 65 or 70 up to 75%. In other embodiments, the amount is no more than 70, 65, 60, 55, or 50 down to 45%. In other embodiments, the amount is 50 to 70%, 55 to 65%, or 57.5 to 67.5%. In one embodiment, the percentage of the fatty acid chains that are saturated is about 62.5% by weight of the fatty acid. In this embodiment, this can be obtained from a 50:50 ratio of hard fatty acid:soft fatty acid.

By hard fatty acid, it is meant that the fatty acid is close to full hydrogenation. In certain embodiments, a fully hydrogenated fatty acid has an iodine value of 10 or less. By soft, it is meant that the fatty acid is no more than partially hydrogenated. In certain embodiments, a no more than partially hydrogenated fatty acid has an iodine value of at least 40. In certain embodiments, a partially hydrogenated fatty acid has an iodine value of 40 to 55. The iodine value can be measured by ASTM D5554-95 (2006). In certain embodiments, a ratio of hard fatty acid to soft fatty acid is 70:30 to 40:60, In other embodiments, the ratio is 60:40 to 40:60 or 55:45 to 45:55. In one embodiment, the ratio is about 50:50. Because in these specific embodiments, each of the hard fatty acid and soft fatty acid cover ranges for different levels of saturation (hydrogenation), the actual percentage of fatty acids that are fully saturated can vary.

In certain embodiments, soft tallow contains approximately 47% saturated chains by weight. [0041] The percentage of saturated fatty acids can be achieved by using a mixture of fatty acids to make the esterquat, or the percentage can be achieved by blending esterquats with different amounts of saturated fatty acids.

The fatty acids can be any fatty acid that is used for manufacturing esterquats for fabric softening. Examples of fatty acids include, but are not limited to, coconut oil, palm oil, tallow, rapeseed oil, fish oil, or chemically synthesized fatty acids. In certain embodiments, the fatty acid is tallow. For example, the esterquat may be a hydrogenated tallow esterquat, such as TETRANYL L1/90, available commercially from Kao chemicals, Tokyo, Japan.

While the esterquat can be provided in solid form, it is usually present in a solvent in liquid form. In solid form, the esterquat can be delivered from a dryer sheet in the laundry. In certain embodiments, the solvent comprises water. In one aspect, esterquats may be considered a cationic surfactant. In some embodiments, the fabric care composition is substantially free of surfactants other than the fabric softening agent. For example, the fabric care composition is substantially free of surfactants other than esterquat. In some embodiments, the fabric care composition is substantially free of detersive surfactants. In another embodiment, the fabric care composition is substantially free of anionic surfactants.

AI refers to the active weight of the combined amounts for monoesterquat, diesterquat, and triesterquat. Delivered AI refers to the mass (in grams) of esterquat used in a laundry load. A load is 3.5 kilograms of fabric in weight. As the size of a load changes, for example using a smaller or larger size load in a washing machine, the delivered AI adjusts proportionally. In certain embodiments, the delivered AI is 2.8 to 8 grams per load. In other embodiments, the delivered AI is 2.8 to 7, 2.8 to 6, 2.8 to 5, 3 to 8, 3 to 7, 3 to 6, 3 to 5, 4 to 8, 4 to 7, 4 to 6, or 4 to 5 grams per load.

Cationic Polymer

In some embodiments, the fabric softening composition of Composition 1.0 et seq, can further comprises one or more cationic polymers. Wherein in some aspects, the fabric softening composition of Composition 1.0 et seq, can further comprise an amine salts or quaternary ammonium salts, e.g., polyquaternium polymers. Preferred are quaternary ammonium salts. They include cationic derivatives of natural polymers such as some polysaccharide, gums (e.g., cationic guar gums), starch and certain cationic synthetic polymers such as polymers and co-polymers of cationic vinyl pyridine or vinyl pyridinium halides.

In some aspects the polymers are water soluble, for instance to the extent of at least 0.5% by weight at 20° C. Preferably they have molecular weights of from about 600 to about 1,000,000, more preferably from about 600 to about 500,000, even more preferably from about 800 to about 300,000, and especially from about 1000 to 10,000. As a general rule, the lower the molecular weight the higher the degree of substitution (D.S.) by cationic, usually quaternary groups, which is desirable, or, correspondingly, the lower the degree of substitution the higher the molecular weight which is desirable, but no precise relationship appears to exist. In general, the cationic polymers should have a charge density of at least about 0.01 meq/gm., preferably from about 0.1 to about 8 meq/gm., more preferably from about 0.5 to about 7, and even more preferably from about 2 to about 6. Suitable desirable cationic polymers are disclosed in "CTFA International Cosmetic Ingredient Dictionary", Fourth Edition, J. M. Nikitakis, et al, Editors, published by the Cosmetic, Toiletry, and Fragrance Association, 1991, incorporated herein by reference. In one aspect, the fabric softener composition of Composition 1.0 et seq can include a polyquaternium compound selected from: polyquaternium-1, polyquaternium-2, polyquaternium-3, polyquaternium-4, polyquaternium-5, polyquaternium-6, polyquaternium-7, polyquaternium-8, polyquaternium-9, polyquaternium-10, polyquaternium-11, polyquaternium-12, polyquaternium-13, polyquaternium-14, polyquaternium-15, polyquaternium-16, polyquaternium-17, polyquaternium-18, polyquaternium-19, polyquaternium-20, polyquaternium-21, polyquaternium-22, polyquaternium-23, polyquaternium-24, polyquaternium-25, polyquaternium-26, polyquaternium-27, and polyquaternium-28.

In one aspect, the cationic polymer a co-softening agent. The co-softening agent may be a polyquaternium polymer, e.g., a cationic polyquaternium polymer. According to one embodiment, the co-softening agent is a stable, water-soluble, and liquid polyquaternium polymer. In one aspect, for example, the co-softening agent may be polyquaternium-7. Polyquaternium-7 has a CAS Number: 26590-05-6, and the empirical formula: $(C8H16NC3H5NOCl)x$. The polyquaternium-7 is the polymeric quaternary ammonium salt consisting of acrylamide and dimethyl diallyl ammonium chloride monomers. Polyquatemium-7 is available commercially as NOVERITE 300 from Lubrizol Corporation, Wickliffe, Ohio, and as FLOCARE L.S737, from SNF Floerger, Andrezieux, France.

In one embodiment, the fabric care composition includes up to 0.30 weight % co-softening agent (e.g., polyquaternium-7), based on the total weight of the fabric care composition. In other embodiments, the fabric care composition includes from 0.05 weight % to 0.25 weight % co-softening agent or from 0.05 weight % to 0.20 weight % co-softening agent. For example, the fabric care composition may include from 0.5 weight % to 0.25 weight % polyquaternium-7.

In another embodiment, the amount of co-softening agent in the fabric care composition may be determined by the amount of fabric softening agent to be replaced. That is, the inventors have surprisingly discovered a method of reducing the fabric softening agent (e.g., esterquat) content of a known fabric care composition with established performance characteristics (e.g., softness, fragrance delivery, ease of ironing, wrinkly reducing, dispersion, etc.) by substitution with a co-softening agent (e.g., PQ7) while maintaining similar or superior performance characteristics.

Plasticizer

In some embodiments, the Composition 1.0 et seq can include, but are not limited to, plant-based plasticizers selected from: isopropyl myristate, isopropyl palmitate, isodecyl neopentanoate (such as that commercially available under the brand name Schercemol™ 105 Ester from The Lubrizol Corp. (Wickliffe, Ohio)), isodecyl oleate, and diisopropyl adipate (such as that commercially available under the brand name Schercemol™ DIA Ester from The Lubrizol Corp. (Wickliffe, Ohio)).

In some embodiments, compositions of Composition 1.0, et seq., comprise at least two plant-based plasticizers.

Suitable plasticizers may be provided in the form of a solid, a liquid, or an emulsion depending on the particular parameters of the application. Like tallow, in one aspect, the plasticizer component functions to decrease the melting temperature of the composition.

Chelating Agents

Chelating agents, or 'sequestering agents', are molecules capable of forming stable complexes with metal ions. In hard water, calcium and magnesium ions are thus inactivated, and the water is effectively softened. The fabric care composition of 1.0 et seq can include any selected from: a phosphonic chelating agent (e.g., etidronic acid (1-hydroxyethylidene-1,1-diphosphonic acid)), citric acid (CA), EDTA, hydroxyamino-polycarboxylic acid (HACA), diethylenetriamine pentaacetic acid (DTPA), hydroxy ethylenediamine-triacetic acid (HEDTA), tetrakis hydroxymethyl phosphonium sulfate (THPS), nitrilotriacetic acid (NTA), and glutamic acid—diacetic acid (GLDA).

Water

The fabric care composition of Composition 1.0 et seq may include an aqueous carrier. For example, the fabric care composition may include water as the carrier. In certain embodiments, the amount of water is at least 30%, 40%, 50%, 60%, 70%, 80%, 85%, 90%, or 95% by weight of the composition. In one embodiment, the fabric care composition includes 25 weight % or more water, based on the total weight of the fabric care composition. In other embodiments, the fabric care composition includes 50 weight % or more water or 75 weight % or more water, based on the total weight of the fabric care composition.

In some embodiments, the fabric care composition may be a low-water or "concentrated" formulation intended to be diluted before use. In such embodiments, the fabric care composition includes lower amounts of the aqueous carrier. In certain embodiments, the amount of water is no more than 50%, 40%, 30%, 20%, 15%, or 10% by weight of the composition. For example, the fabric care composition may include 50 weight % or less water or 30 weight % or less water, based on the total weight of the fabric care composition.

The fabric care composition may also include other components commonly used in fabric care compositions in minor amounts to enhance either the appearance or performance of the fabric care compositions. For example, the fabric care composition may include thickeners, fragrances, preservatives, colorants such as dyes or pigments, bluing agents, germicides, and opacifying agents.

In some embodiments, the fabric care composition must be easily pourable by an end user. Accordingly, the viscosity of the fabric care composition should not exceed 500 centipois (cP) for ready-to-use fabric care compositions, preferably not more than 250 cP, and 10,000 cP for fabric care composition intended for dilution before use. In one embodiment, the fabric care composition has a pour viscosity from 30 to 500 cP, or from 50 to 200 cP, unless otherwise specified, viscosity is measured at 25° C. using a Brookfield RVTD Digital Viscometer with Spindle #2 at 50 rpm.

Polymers

In some embodiments, the fabric softener of Composition 1.0 et seq can comprise contain a polyethylene glycol polymer or a polyethylene glycol alkyl ether polymer. In some embodiments, the polyethylene glycol polymer or polyethylene glycol alkyl ether polymer prevents gelation of the composition. The polyethylene glycol polymers as used herein, have a molecular weight of at least about 200, up to a molecular weight of about 8,000. Useful polymers include, but are not limited to, the polyethylene glycol methyl ether polymers marketed by Aldrich Chemical Company. Useful amounts of polymer in the compositions range from about 0.1% to about 5% by weight. A range about 0.5% to about 1.5% by weight is preferred.

Thickeners

In order to adjust the viscosity, the fabric care composition of Composition 1.0 et seq may include one or more thickeners. The one or more thickeners may include cationic polymeric thickeners that are water soluble and with a high molecular weight. For example, the thickener can be a cross-linked cationic polymer such as FLOSOFT DP200. FLOSOFT DP200 is commercially available from SNF Floerger, and is described in U.S. Pat. No. 6,864,223 to Smith et ai. FLOSOFT DP200 is a water soluble cross-linked cationic polymer derived from the polymerization of from 5 to 100 mole percent of cationic vinyl addition monomer, from 0 to 95 mole percent of acrylamide, and from 70 to 300 ppm of a difunctional vinyl addition monomer cross-linking agent.

Other suitable thickener are water-soluble cross-linked cationic vinyl polymers which are cross-linked using a cross-linking agent of a difunctional vinyl addition monomer at a level of from 70 to 300 ppm, preferably from 75 to 200 ppm, and most preferably of from 80 to 150 ppm. These polymers are further described in U.S. Pat. No. 4,806,345, and other polymers that may be utilized are disclosed in WO 90/12862. Generally, such polymers are prepared as water-in-oil emulsions, wherein the cross-linked polymers are dispersed in mineral oil, which may contain surfactants. During finished product making, in contact with the water phase, the emulsion inverts, allowing the water soluble polymer to swell. The most preferred thickener may be a cross-linked copolymer of a quaternary ammonium acetate or methacrylate in combination with an acrylamide comonomer. The thickener may provide the fabric care composition long term stability upon storage and allows the presence of relatively high levels of electrolytes without affecting the composition stability. Additionally, the fabric care compositions remain stable when shear is applied thereto. In certain embodiments, the amount of this thickening polymer is at least 0.001 weight ¾. In other embodiments, the amount is 0,001 to 0.35 weight %.

In one aspect, the thickener of the fabric softener compositions of Composition 1.0, et seq comprises a cellulose ether substrate. In one aspect, the cellulose ether substrate which is used to form the modified cellulose ether for use in Composition 1.0, et seq, can be any nonionic water-soluble cellulose ether substrate such as for instance, hydroxyethyl cellulose, hydroxypropyl cellulose, methyl cellulose, hydroxypropyl methyl cellulose, ethyl hydroxy ethyl cellulose and methyl hydroxyethyl cellulose. In one aspect, the cellulose ether substrate is a hydroxyethyl cellulose.

The amount of nonionic substituent to the substrate such as methyl, hydroxyethyl or hydroxypropyl does not appear to be critical so long as there is sufficient to assure that the cellulose ether substrate is water-soluble.

The cellulose ether substrate to be modified is preferably of low to medium molecular weight i.e. less than about 800,000 and preferably between about 20,000 and 500,000, more preferred between 20,000 and 100,000. In some aspects, the cellulose ether substrate (e.g., HEC) can be preferably up to about 0.8%, such as, for example, from 0.1% to 0.6%, by weight of the total composition (e.g., about 0.4% by wt.), in order to provide acceptable viscosity levels over time.

In one embodiment, the fabric care composition includes 0.5 weight % or less thickener, based on the total weight of the fabric care composition. In other embodiments, the fabric care composition includes 0.1 weight % or less thickener or 0.05 weight % or less thickener, based on the total weight of the fabric care composition.

Fragrances, Perfumes, Colors, and Dyes

In one aspect, Composition 1.0 et seq may include one or more fragrances, fragrance oils, or perfumes. As used herein, the term "fragrance" is used in its ordinary sense to refer to and include any non-water soluble fragrant substance or mixture of substances including natural (i.e., obtained by extraction of flower, herb, blossom or plant), artificial (i.e., mixture of natural oils or oil constituents) and synthetically produced odoriferous substances. As used herein, fragrance, or perfume, refers to odoriferous materials that are able to provide a desirable fragrance to fabrics, and encompasses conventional materials commonly used in detergent compositions to provide a pleasing fragrance and/or to counteract a malodor. The fragrances are generally in the liquid state at ambient temperature, although solid fragrances can also be used. Fragrance materials include, but are not limited to, such materials as aldehydes, ketones, esters and the like that are conventionally employed to impart a pleasing fragrance to laundry compositions. Naturally occurring plant and animal oils are also commonly used as components of fragrances.

Composition 1.0, et seq can also include a perfume. As used herein, the term "perfume" is used in its ordinary sense to refer to and include any non-water soluble substance or a mixture of substances, including natural (i.e., obtained by extraction of flowers, herbs, blossoms, or plants), artificial (i.e., mixtures of natural oils or oil constituents), and synthetically produced odoriferous substances. Typically, perfumes are complex mixtures or blends of various organic compounds, such as alcohols, aldehydes, ethers, aromatic compounds, and varying amounts of essential oils (e.g., terpines), the essential oils themselves being volatile, odoriferous compounds, and also serving to dissolve the other components of the perfume.

The fabric care composition may include free fragrances, encapsulated fragrances, or a mixture of both. In one aspect, the fabric softening composition of 1.0, et seq, contains fragrance capsules.

In other embodiments, the fabric care composition may be provided as a fragrance-free composition. The amount of fragrance can be any desired amount depending on the preference of the user. In certain embodiments, the total amount of fragrance is from 0.3 weight % to 3 weight % based on the total weight of the fabric care composition. The fragrance can be in free form, encapsulated, or both.

Preservatives

The fabric care composition of Composition 1.0 et seq may further comprises one or more organic acids, such as lactic acid or phosphonic acid. For example, the fabric care composition may include a preservative system comprising combinations of food grade lactic acid and amino trimethyl phosphonic acid. In certain embodiments, the fabric care composition may also include isothiazolinones as preservatives. For example, the one or more preservatives may include a (OIT/MIT/CIT) isothiazolinone mixture. Suitable isothiazolinone preservatives include the isothiazolinones sold under the trademark KATHON DP3 and available from Rohm & Haas.

In one embodiment, the fabric care composition of Composition 1.0, et seq, includes 0.35 weight % or less of the preservative system, based on the total weight of the fabric care composition. In other embodiments, the fabric care composition includes 0.15 weight % or less preservative or 0.10 weight % or less preservative, based on the total weight of the fabric care composition.

Non-Ionic Surfactants

In certain aspects, the fabric softener composition of Composition 1.0 et seq., can contain a non-ionic surfactant as a fabric softener component. In one aspect, the non-ionic surfactant can be suitable as rinse aid surfactants.

The non-ionic surfactant may be, for example, fatty alcohol polyethylene glycol ether or fatty alcohol ethoxylates, alkylphenol ethoxylates, ethylene oxide and propylene oxide co-polymers, amine oxides, alkylamines, alkanolamines, polyglycerol esters, alkyl polyglucosides, and fatty acid N-alkylglucosamides. Preferred non-ionics are fatty alcohol polyethylene glycol ether or fatty alcohol ethoxylates. In one aspect, Composition 1.0 et seq comprises a non-ionic surfactant (e.g., fatty alcohol polyethylene glycol ether) in an amount from 1.0% by wt. –5.0% by wt (e.g., about 3.0% by wt.) of the total composition.

A preferred class of non-ionic surfactant is an alkyl chain in the range C10 to C18 linked to repeated ethoxylate groups; most preferred are alkyl chains having a chain length range C12 to C15. One will appreciate that the melting point of the non-ionic is effected by both the chain length or nature of the chain length i.e., branching and number of ethoxylate/propyloxlate groups.

The greater the number of repeated ethoxylate-groups the greater the melting point of the non-ionic surfactant. A preferred non-ionic surfactant is a C10 to C18 alkyl chain distribution covalently bound to at least 40 EO; the link between the ethoxylate and the alkyl chain may either be an ester (fatty alcohol ethoxylates) or an ether linkage (fatty alcohol polyethylene glycol ether).

The invention will now be described in conjunction with the following, non-limiting examples. Unless stated otherwise, all percentages of composition components given in this specification are by weight based on a total composition or formulation weight of 100%.

It is understood that, in certain cases, an ingredient may perform multiple functions.

The compositions and formulations as provided herein are described and claimed with reference to their ingredients, as is usual in the art. As would be evident to one skilled in the art, the ingredients may in some instances react with one another, so that the true composition of the final formulation may not correspond exactly to the ingredients listed. Thus, it should be understood that the invention extends to the product of the combination of the listed ingredients.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

EXAMPLES

Example 1

Softening, pH, and Viscosity Performance Compared to a Synthetic Softener (Polyquaternium-7) of Test Formulas 1-5

The pH, viscosity, appearance and softening performance are various formulas plant-based ingredients are tested in comparison to a synthetic softener: polyquaternium-7. The formulas are designated "1-5" and are described in Table 1, and characterized by in Table 1B.

Prototypes with HEC demonstrate viscosities up to 100 cps. Accordingly, this thickener is helping to achieve the target viscosity of from 100-180 cps. Option 2 and 4, which contain cationic guar gum present a very slight cloudiness. This is believed to be generated by the incomplete dispersion of this gum. In terms of performance, option 3—which uses a glycerin/isopropyl palmitate backbone as softening agents—and option 5—which uses a glycerin/cationic wheat protein as softening agents—demonstrate parity softening performance relative to a market softener that does not use plant-based softeners. Softness undergoes testing using an internal panel and phabrometer, and the results are detailed in Table 1B. In the consumer panel for softness, the market softener scored a "46". Using the phabrometer to test softness, the market softener scores a "3.1" and a sample with only detergent scores a "2.4".

A Phabrometer test is used to quantity the sensory perception in contact with human skin. The principle of Phabrometer system is insertion/extraction of a piece of circular fabric through a nozzle. All the information related to fabric hand is reflected by the resulting load-displacement extraction curve. The instrument provides a final softness score between 1 to 10 and a significant test of sample differences based on instrument model significance and also based on the differences between samples judge by panel significance model. Option 3, 5 and market softener showed superior softening performance comparing with detergent, and parity performance between them.

The softening performance is conducted by phabrometer (SOP) and by internal panel test. Internal Panel test uses a variety of commercial drying machines. Treated towels are evaluated through an internal untrained panel where a pair of towels was presented—the softer towel=2, and the other towel=1. Each test formulation is compared 8 times against each other test formulation. Based on final rates the softness of each prototype is defined. A statistical comparison is done to determine significance, and the scores are listed in Table 1B.

The best prototypes that are identified from this experiment are options 3 and 5 from Table 1. These options contain glycerin and either isopropyl palmitate or a cationic wheat protein. The last formula is effectively a positive control in that it uses polyquaternium-7 which is proven synthetic softening agent.

TABLE 1

| Ingredient* | 1 | 2 | 3 | 4 | 5 | Positive Control |
|---|---|---|---|---|---|---|
| Decan-1-ol | 2 | 2 | 2 | 1.5 | 1.5 | 1.5 |
| Glycerin | 1.5 | 1.5 | 1.6 | 1.6 | 1.6 | 1.6 |
| Isopropyl palmitate | 0.12 | 0.12 | 0.1 | 0 | 0 | 0 |
| Fragrance | 0.5 | 0.5 | 0.5 | 0.5 | 0.5 | 0.5 |
| Lactic acid | 0.1 | 0.1 | 0.1 | 0.1 | 0.1 | 0.1 |
| Hydroxyethyl cellulose (HEC) | 0 | 0 | 0.4 | 0.32 | 0.4 | 0.4 |
| Cationic Guar | 0 | 0.06 | 0 | 0.05 | 0 | 0 |
| Cationic wheat protein | 0 | 0 | 0 | 0 | 0.25 | 0 |
| Polyquaternium 7 | 0 | 0 | 0 | 0 | 0 | 0.6 |

*all values in Table 1 provided by wt % of the total composition.
Water is unlisted, but included to balance in Formulas 1-5, and the positive control.

TABLE 1B

| Test | 1 | 2 | 3 | 4 | 5 | Positive Control |
|---|---|---|---|---|---|---|
| pH | 3.21 | 3.2 | 2.96 | 2.93 | 2.92 | 2.86 |
| Viscosity (cps) | 8 | 26 | 110 | 128 | 122 | 151 |
| Softening Score (Panel) | 43 | 44 | 47 | 45 | 46 | N/A |
| Softening Score (Phabrometer) | 2.0 | 2.0 | 3.6 | 1.7 | 3.3 | N/A |

Example 2

Turbidity

The dispersion of various fragrances is tested in the 5 prototypes described in Table 1 above. The turbidity of the samples—measured in NTUs, Table 2—and their cloud point at cold and hot temperature are evaluated. In one aspect, all the tested samples show very low turbidity values when considering that the limit for NTUs (Nephelometric Turbidity Units) in Cleaners Products is less than 5.0. The measurement of turbidity is conducted with a 2100Q Portable Turbidimeter which measures the intensity of light scattered at 90 degrees as a beam of light passes through a liquid sample, giving a direct response in NTU. The NTU is a unit measuring the lack of clarity of liquids and is used by water and sewage treatment plants, in marine studies, for example. For example, water containing 1 milligram of finely divided silica per liter has a turbidity of 1 NTU. The water to be measured is placed in a standard container. A light beam passes through the water and strikes a sensor on the other side of the container. A second sensor is mounted at right angles to the beam, measuring light scattered by particles in the water. From the ratio between the light intensities at the two sensors the turbidity in NTU can be calculated.

Test Formulas 2 and 4—which use cationic guar—are not fully clear in their appearance. For example, in one aspect, some very small suspended transparent particles are detected by eye. It is believed that this gum cannot be fully dispersed.

Regarding cloud point, almost all of the values were up to 50° C. for the test at hot temperature and not believed to have significant differences for each of the tested fragrances. Higher cloud points are observable for the base (no fragrance). For the cloud point at cold temperature almost all of the values are below 0° C. and not believed to have significant differences between each of the tested fragrances. Lower cloud points are observed for the options 3, 5 and the positive control, being the most stables at lower temperatures. Cloud point results can help to provide some preliminary idea of the stability of the samples at high and low temperatures during aging.

The formula description of Test Formulas 1-5, and the Positive Control, listed in Tables 2, 3, and 4, are as described in Table 1 of Example 1 above. Fragrances A, B, C, and D are added to each of Test Formula 1-5. Fragrances A, B, C and D represent distinct fragrances. The results of the addition of the fragrances to Test Formulas 1-5, and the Positive Control, are listed in Tables 2, 3, and 4.

TABLE 2

| | | Turbidity (NTUs) | | | |
|---|---|---|---|---|---|
| Test Formula | Formula Backbone | Fragrance A | Fragrance B | Fragrance C | Fragrance D |
| 1 | Glycerin, IPP | 2.7 | 2.9 | ND | ND |
| 2 | Glycerin, IPP, guar | 3.19 | 3.61 | 3.13 | 3.63 |
| 3 | Glycerin, HEC, IPP | 3.44 | 3.3 | 2.75 | 3.27 |
| 4 | Glycerin, HEC, guar | 4.57 | 4.15 | 3.73 | 3.12 |
| 5 | Glycerin, HEC, cationic wheat protein | 2.65 | 3.05 | 1.99 | 2.64 |
| Positive Control | Glycerin HEC, PQ7 | 2.84 | 2.8 | 1.97 | 2.65 |

"IPP": Isopropyl palmitate

TABLE 3

| Cloud point evaluations at hot temperature ("R" = Recover) ("C" = Clouding)* | | | | | | | | | | |
|---|---|---|---|---|---|---|---|---|---|---|
| | Base (No Fragrance) | | Fragrance A | | Fragrance B | | Fragrance C | | Fragrance D | |
| Sample | C (° C.) | R (° C.) | C (° C.) | R (° C.) | C (° C.) | R (° C.) | C (° C.) | R (° C.) | C (° C.) | R (° C.) |
| 1 | ND | ND | ND | ND | ND | ND | ND | ND | ND | ND |
| 2 | 78 | 77 | 57 | 57.5 | 55 | 54 | 61 | 58.5 | 60-62 | 59.5 |
| 3 | ND | ND | 53 | 52.5 | 53.5 | 53 | 54 | 53 | 56-58.5 | 54.5 |

TABLE 3-continued

Cloud point evaluations at hot temperature ("R" = Recover) ("C" = Clouding)*

| | Base (No Fragrance) | | Fragrance A | | Fragrance B | | Fragrance C | | Fragrance D | |
|---|---|---|---|---|---|---|---|---|---|---|
| Sample | C (° C.) | R (° C.) | C (° C.) | R (° C.) | C (° C.) | R (° C.) | C (° C.) | R (° C.) | C (° C.) | R (° C.) |
| 4 | 80 | 79.5 | 48.5 | 47.5 | 48.5 | 48.8 | 53 | 52.5 | 50-52 | 49.5 |
| 5 | 85 | 84.5 | 53 | 51.5 | 56-58 | 55 | 61.5 | 58.5 | 57-60 | 55.5 |
| P.C. | ND | ND | 46 | 45 | 49-52 | 47.5 | 50.5 | 50 | 49-51 | 49.5 |

*All data provided in degrees Celsius.

TABLE 4

Cloud point evaluations at cold temperature ("R" = Recover) ("C" = Clouding)*

| | Base (No Fragrance) | | Fragrance A | | Fragrance B | | Fragrance C | | Fragrance D | |
|---|---|---|---|---|---|---|---|---|---|---|
| Sample | C (° C.) | R (° C.) | C (° C.) | R (° C.) | C (° C.) | R (° C.) | C (° C.) | R (° C.) | C (° C.) | R (° C.) |
| 1 | ND | ND | ND | ND | −3.1 | 3 | ND | ND | ND | ND |
| 2 | 0.1 | 2 | −3.5 | 0.5 | −4.5 | 3.8 | −3.8 | 1.2 | −0.2 | 0.9 |
| 3 | ND | ND | −2.1 | 2 | −3.3 | 3.5 | −1.2 | 1.6 | −0.6 | 2.1 |
| 4 | 0 | 1.5 | 0.3 | 2.7 | −3.6 | 3.1 | 3.1 | 4 | 1.2 | 3.1 |
| 5 | 0.3 | 1.6 | −3.3 | 1.8 | −4.1 | 1.9 | −2.5 | 0.9 | −1.1 | 2.8 |
| P.C. | ND | ND | −3.7 | 1.3 | −3.1 | 2.1 | −3.3 | 1.5 | −3.5 | 0.7 |

*All data provided in degrees Celsius.

Test Formulations 3, 5, and the Positive Control, above having different fragrances, are exposed to continuous light at 725 W/$m_2$/from 300 to 800 nm/using filter C at 55° C. BPT for 16 hours (i.e., the "Sun Test"). Test Formulations 3 and 5, and Positive Control (P.C), are stable under the described conditions, with no detected changes in color, turbidity and consistency.

From the data obtained in Tables 1-4, the two formulas identified are Formula 3 and Formula 5. Both Test Formulas 3 and 5 demonstrate acceptable appearance, viscosity, pH after making, and perform at parity—relative to the market formulation—with respect to softening performance. Moreover, Formulas 3 and 5 does not show changes in color in the "Sun Test", and also does not appear to demonstrate cloudiness in the cloud point test at both hot and cold temperature.

Example 3

Preservative Efficacy

Base composition of batches used to generate samples antibacterial assays

| Ingredient* | Base Formula A | Base Formula B |
|---|---|---|
| Decan-1-ol | 2 | 2 |
| Glycerin | 1.6 | 1.6 |
| Isopropyl palmitate | 0.1 | 0.1 |
| Fragrance A | 0.5 | 0.55 |
| Lactic acid (80%) | 0.1 | 0.1 |
| Hydroxyethyl cellulose (HEC) | 0.4 | 0.4 |
| SAG Antifoam 4865 | 0.003 | 0.003 |
| Cationic wheat protein | 0 | 0.42 |

-continued

| Ingredient* | Base Formula A | Base Formula B |
|---|---|---|
| Caustic soda (Sol. 38%) | 0.006 | 0.006 |
| Water | To balance (e.g., about 94%) | To balance (e.g., about 94%) |

*all values in Table 1 provided by wt % of the total composition.

Base Formula A and Formula B are then modified to include various preservative combinations as identified in Table 5a and Table 5b. The amounts of the preservative combination in Tables 5a and 5b are the total amounts in the "Final Composition" and relative to the total weight of the "Final Composition":

TABLE 5a (*using Base Formula A)

| Preservative Combinations | Final Composition Designation |
|---|---|
| 0.1% lactic acid | Formula A (1) |
| 0.3% lactic acid | Formula A (2) |
| 0.3% lactic acid and 0.15% etidronic acid | Formula A (3) |
| 0.3% lactic acid and 0.3% caprylyl glycol | Formula A (4) |
| 0.3% lactic acid and 0.3% phenoxyethanol | Formula A (5) |
| 0.1% lactic acid (no fragrance) | Formula A (6) |
| 0.5% lactic acid (0.55% fragrance) | Formula A (7) |

TABLE 5b

| (*using Base Formula B) | |
|---|---|
| Preservative Combinations | Final Composition Designation |
| 0.1% lactic acid (no fragrance) | Formula B (1) |
| 0.1% lactic acid | Formula B (2) |
| 0.3% lactic acid | Formula B (3) |
| 0.5% lactic acid | Formula B (4) |
| 0.3% lactic acid and 0.2% etidronic acid | Formula B (5) |
| 0.3% lactic acid and 0.3% caprylyl glycol | Formula B (6) |
| 0.3% lactic acid and 0.1% sodium benzoate | Formula B (7) |

The modified base formulas (i.e., "Final Composition") listed in Table 5a and Table 5b are subject to tests to evaluate micro-robustness in antimicrobial preservation efficacy testing (APET) and acid antimicrobial preservation effectiveness testing (AAPET).

The AAPET analysis is substantially performed using the guidelines described by Quality Micro Procedure (QMIC) 0058—Acidophilic Bacteria >99.9%. According to the AAPET analysis, a bacteria pool is added to the compositions listed in Table 5, homogenized, and incubated for seven days. After incubation, an aliquot is taken and the amount of the microorganisms/bacteria that survive is counted. After seven days, a new bacteria pool is added into the sample and incubated for another seven days. After the seven days (14 days total), another aliquot is taken and the amount of the microorganisms/bacteria that survive is counted. This procedure is repeated for a total of 35 days.

The Antimicrobial Preservative Effectiveness Test (APET) is a 28 days test that includes inoculating two product samples with separate pools: a bacteria pool and a mold pool. Subsequently, the samples are homogenized and incubated for seven days. After incubation, an aliquot is taken and the amount of the mold and microorganisms/bacteria that survive are counted. Next, a new bacteria pool is added into the sample and incubated for another seven days. After the seven days (14 days total), another aliquot is taken and the amount of the microorganisms/bacteria that survive is counted. This procedure is repeated for a total of 28 days.

For acceptance criteria in both the APET and AAPET assays, regular and acidophilic bacteria must show a Log reduction up to 3.0, as determined on day 7 following each inoculation and show no increase after day 7 of a second inoculation. Regarding molds, acceptance criteria is that samples must demonstrate a Log reduction up to 1.0 as determined on day 7 following inoculation. Moreover, there cannot be an increase after day 7 of a second inoculation. In general, for acceptable preservative efficacy, APET is greater than 3 Log reduction of regular bacteria and greater than 1 Log reduction of mold. Acceptable preservative efficacy is an AAPET of greater than 3 Log reduction of acidophilic bacteria. Tables 6-17 demonstrate efficacy for the following preservative combinations (e.g., in combination with formulations that contain Fragrance A):

1. Formula A:
   - Formula A (3) (0.3% lactic acid and 0.15% etidronic acid); and
   - Formula A (4) (0.3% lactic acid and 0.3% capryl glycol).
2. Formula B:
   - Formula B (5) (0.3% lactic acid and 0.2% etidronic acid)
   - Formula B (6) (0.3% lactic acid and 0.3% capryl glycol); and
   - Formula B (7) (0.3% lactic acid and 0.1% sodium benzoate).

The results from the APET and AAPET tests are as follow:

Final Composition A (1)-(6)

TABLE 6

| (Fresh Samples) Bacteria/Log reduction (APET) | | | | | |
|---|---|---|---|---|---|
| Sample | Day 7 | Day 14 | Day 21 | Day 28 | Overall Pass or Fail |
| Formula A (1) | 5.9 | 5.7 | 5.7 | 5.7 | Pass |
| Formula A (2) | 5.7 | 5.8 | 5.8 | 5.8 | Pass |
| Formula A (3) | 5.7 | 5.8 | 5.8 | 5.8 | Pass |
| Formula A (4) | 5.7 | 5.8 | 5.8 | 5.8 | Pass |
| Formula A (5) | 5.7 | 5.8 | 5.8 | 5.8 | Pass |
| Formula A (6) | 4 | 3.0 | 2.9 | 1.4 | Fail |

TABLE 7

| (Fresh Samples) Mold/Log reduction (APET) | | | | | |
|---|---|---|---|---|---|
| Sample | Day 7 | Day 14 | Day 21 | Day 28 | Overall Pass or Fail |
| Formula A (1) | 1.0 | 1.0 | 0.2 | 0.2 | Fail |
| Formula A (2) | 1.1 | 0.8 | 0.8 | 0.9 | Fail |
| Formula A (3) | 2.3 | 0.9 | 0 | 1.0 | Fail |
| Formula A (4) | 2.2 | 1.9 | 2.2 | 2.4 | Pass |
| Formula A (5) | 2.4 | 1.9 | 2.3 | 2.7 | Pass |
| Formula A (6) | 0.3 | −0.2 | −0.2 | 1.0 | Fail |

TABLE 8

| (Fresh Samples) Acidophilic bacteria/Log reduction (AAPET) | | | | | | |
|---|---|---|---|---|---|---|
| Sample | Day 7 | Day 14 | Day 21 | Day 28 | Day 35 | Overall Pass or Fail |
| Formula A (1) | 4.7 | 3.8 | 3.8 | 3.8 | 3.8 | Pass |
| Formula A (2) | −0.1 | −1.1 | −0.8 | −1.1 | −1.0 | Fail |
| Formula A (3) | 4.7 | 1.3 | −0.1 | −0.7 | −1.1 | Fail |
| Formula A (4) | 4.7 | 3.8 | 3.8 | 3.8 | 3.8 | Pass |
| Formula A (5) | 4.7 | 3.8 | 3.8 | 2.8 | −1.1 | Fail |
| Formula A (6) | −0.2 | 0.8 | −0.9 | −1.2 | −0.8 | Fail |

TABLE 9

| (Aged Samples) Bacteria/Log reduction (APET) | | | | | |
|---|---|---|---|---|---|
| Sample | Day 7 | Day 14 | Day 21 | Day 28 | Overall Pass or Fail |
| Formula A (1) | 5.9 | 5.8 | 5.8 | 5.8 | Pass |
| Formula A (3) | 5.9 | 5.8 | 5.8 | 5.8 | Pass |
| Formula A (4) | 5.9 | 5.8 | 5.8 | 5.8 | Pass |
| Formula A (5) | 5.9 | 5.8 | 5.8 | 5.8 | Pass |
| Formula A (6) | 5.9 | 4.2 | 2.9 | 1.9 | Fail |

TABLE 10

(Aged Samples)
Mold/Log reduction (APET)

| Sample | Day 7 | Day 14 | Day 21 | Day 28 | Overall Pass or Fail |
|---|---|---|---|---|---|
| Formula A (1) | 0.2 | 0.4 | 0.3 | 0.4 | Fail |
| Formula A (3) | 2 | 1.9 | 2.8 | 2.9 | Pass |
| Formula A (4) | 1.8 | 1.5 | 3.5 | 3.8 | Pass |
| Formula A (5) | 3.1 | 0.6 | 2.2 | 3.8 | Fail |
| Formula A (6) | 0.2 | 0.2 | 0.3 | 0.4 | Fail |

TABLE 11

(Aged Samples)
Acidophilic bacteria/Log reduction (AAPET)

| Sample | Day 7 | Day 14 | Day 21 | Day 28 | Day 35 | Overall Pass or Fail |
|---|---|---|---|---|---|---|
| Formula A (1) | 0.7 | −0.7 | −0.6 | 0.0 | −0.8 | Fail |
| Formula A (3) | 5.6 | 5.2 | 5.2 | 5.2 | 5.2 | Pass |
| Formula A (4) | 5.6 | 5.2 | 5.2 | 5.2 | 5.2 | Pass |
| Formula A (5) | 5.6 | 5.2 | 5.2 | 5.2 | 5.2 | Pass |
| Formula A (6) | 0.8 | −0.4 | −0.3 | −0.5 | −0.8 | Fail |

Final Composition B (1)-(7)

TABLE 12

(Fresh Samples)
Bacteria/Log reduction (APET)

| Sample | Day 7 | Day 14 | Day 21 | Day 28 | Overall Pass or Fail |
|---|---|---|---|---|---|
| Formula B (2) | 5.7 | 4.2 | 3.0 | 3.9 | Fail |
| Formula B (3) | 5.7 | 4.4 | 3.8 | 3.8 | Fail |
| Formula B (4) | 5.7 | 4.4 | 3.2 | 4.2 | Fail |
| Formula B (5) | 5.7 | 5.7 | 5.1 | 5.7 | Pass |
| Formula B (6) | 5.7 | 5.7 | 5.7 | 5.7 | Pass |
| Formula B (7) | 5.7 | 5.7 | 5.7 | 5.7 | Pass |
| Formula B (1) | 5.7 | 4 | 3.0 | 1.9 | Fail |
| Formula A (7) | 5.7 | 4.2 | 3.0 | 3.9 | Fail |

TABLE 13

(Fresh Samples)
Mold/Log reduction (APET)

| Sample | Day 7 | Day 14 | Day 21 | Day 28 | Overall Pass or Fail |
|---|---|---|---|---|---|
| Formula B (2) | 3.6 | 0 | 0 | 0.7 | Fail |
| Formula B (3) | 3.6 | −0.1 | 0.2 | 0.8 | Fail |
| Formula B (4) | 3.6 | 0.9 | 1.1 | 1.9 | Fail |
| Formula B (5) | 3.6 | 2.8 | 3.4 | 3.4 | Pass |
| Formula B (6) | 3.6 | 2.2 | 3.4 | 3.4 | Pass |
| Formula B (7) | 3.6 | 3.4 | 3.4 | 3.4 | Pass |
| Formula B (1) | 3.6 | 0.8 | −0.1 | 0.7 | Fail |
| Formula A (7) | 3.6 | −0.3 | −0.2 | −0.2 | Fail |

TABLE 14

(Fresh Samples)
Acidophilic bacteria/Log reduction (AAPET)

| Sample | Day 7 | Day 14 | Day 21 | Day 28 | Day 35 | Overall Pass or Fail |
|---|---|---|---|---|---|---|
| Formula B (2) | 1.0 | 0.2 | −0.6 | 0.7 | −0.6 | Fail |
| Formula B (3) | 5.2 | 5.2 | 0.8 | −0.5 | 0.2 | Fail |
| Formula B (4) | 5.2 | 5.2 | 5.2 | 3.4 | 1.3 | Fail |
| Formula B (5) | 5.2 | 5.2 | 5.2 | 5.2 | 5.2 | Pass |
| Formula B (6) | 5.2 | 5.2 | 5.2 | 5.2 | 5.2 | Pass |
| Formula B (7) | 5.2 | 5.2 | 5.2 | 5.2 | 5.2 | Pass |
| Formula B (1) | 0.6 | 0.3 | −0.9 | 0.3 | −0.9 | Fail |
| Formula A (7) | 1.2 | 0.3 | 0.2 | 1.0 | −0.6 | Fail |

TABLE 15

(Aged Samples)
Bacteria/Log reduction (APET)

| Sample | Day 7 | Day 14 | Day 21 | Day 28 | Overall Pass or Fail |
|---|---|---|---|---|---|
| Formula B (2) | 4 | 4 | 3.0 | 3.5 | Fail |
| Formula B (3) | 4.8 | 3.6 | 3.6 | 3.0 | Fail |
| Formula B (4) | 5.8 | 3.6 | 3.6 | 4.0 | Fail |
| Formula B (5) | 5.8 | 5.8 | 5.8 | 5.8 | Pass |
| Formula B (6) | 5.8 | 5.8 | 5.8 | 5.8 | Pass |
| Formula B (7) | 5.8 | 5.8 | 5.8 | 5.8 | Pass |
| Formula B (1) | 4 | 3 | 2.5 | 1.3 | Fail |
| Formula A (7) | 4.8 | 2.3 | 2.0 | 2.3 | Fail |

TABLE 16

(Aged Samples)
Mold/Log reduction (APET)

| Sample | Day 7 | Day 14 | Day 21 | Day 28 | Overall Pass or Fail |
|---|---|---|---|---|---|
| Formula B (2) | 3.4 | 0.8 | 0.8 | 0.8 | Fail |
| Formula B (3) | 3.4 | 1 | 1 | 1 | Pass |
| Formula B (4) | 3.4 | 2 | 2 | 2 | Pass |
| Formula B (5) | 3.4 | 3.4 | 3.4 | 3.4 | Pass |
| Formula B (6) | 3.4 | 3.4 | 3.4 | 3.4 | Pass |
| Formula B (7) | 3.4 | 3.4 | 3.4 | 3.4 | Pass |
| Formula B (1) | 3.5 | −0.1 | −0.2 | 0.0 | Fail |
| Formula A (7) | 3.5 | −0.1 | 0.0 | 0.8 | Fail |

TABLE 17

(Aged Samples)
Acidophilic bacteria/Log reduction (AAPET)

| Sample | Day 7 | Day 14 | Day 21 | Day 28 | Day 35 | Overall Pass or Fail |
|---|---|---|---|---|---|---|
| Formula B (2) | 1.1 | 0.4 | −0.1 | 0.4 | 0.1 | Fail |
| Formula B (3) | 5.6 | 5.6 | 5.6 | 5.6 | 5.6 | Pass |
| Formula B (4) | 5.6 | 5.6 | 5.6 | 5.6 | 5.6 | Pass |
| Formula B (5) | 5.6 | 5.6 | 5.6 | 5.6 | 5.6 | Pass |
| Formula B (6) | 5.6 | 5.6 | 5.6 | 5.6 | 5.6 | Pass |
| Formula B (7) | 5.6 | 5.6 | 5.6 | 5.6 | 5.6 | Pass |
| Formula B (1) | 0.8 | 0.5 | 0.1 | −0.4 | −0.3 | Fail |
| Formula A (7) | 0.2 | 0.4 | 0.1 | −0.4 | −0.1 | Fail |

Example 4

Representative Formulations

The following formulation are representative fabric softener formulas of the instant invention. All values are by wt % of the total composition:

| Ingredients | Formula 6 | Formula 7 | Formula 8 |
|---|---|---|---|
| Demineralized Water | To Balance (e.g., about 94% by wt) | To Balance (e.g., about 94% by wt) | To Balance (e.g., about 94% by wt) |
| Lactic Acid - 80% | 0.3 | 0.3 | 0.3 |
| 99% Natural Glycerin | 1.6 | 1.6 | 1.6 |
| Hydroxyethyl Cellulose | 0.4 | 0.4 | 0.4 |
| Caustic Soda (38% Sodium Oxide) | 0.01 | 0.01 | 0.01 |
| Etidronic Acid - 60% | 0.2 | 0.2 | 0.2 |
| Non-Ionic Surfactant | 3.0 | 3.0 | 3.0 |
| Isopropyl Palmitate | 0.1 | 0.1 | 0.1 |
| Silicone Defoamer | 0.003 | 0.003 | 0.003 |
| Fragrance and Color | 0.5 | 0.53 | 0.48 |
| Total | 100.0 | 100.0 | 100.0 |

What is claimed is:

1. A fabric softening composition comprising:

a natural thickener comprising a nonionic cellulose ether;

a polyhydric alcohol; and a plant-based softening agent comprising one or more agents selected from:

a.) a plasticizer, wherein the plasticizer comprises isopropyl palmitate, and wherein the plasticizer is present in an amount from 0.05% to 0.2% by wt of the total composition; or b.) a hydrolyzed plant protein obtained from grains of the family Poaceae, wherein the hydrolyzed plant protein is partially hydrolyzed maize (corn), wheat, rice, barley, oat, or millet protein.

2. The fabric softener composition of claim 1, wherein the nonionic cellulose ether is methyl cellulose ether, hydroxyethyl cellulose ether or hydroxypropyl cellulose ether.

3. The fabric softener composition of claim 1, wherein the nonionic cellulose ether is selected from: hydroxyethyl cellulose (HEC), hydroxypropyl cellulose (HPC), methyl cellulose, hydroxypropyl methyl cellulose; ethyl hydroxyethyl cellulose and methyl hydroxyethyl cellulose.

4. The fabric softener composition of claim 1, wherein the nonionic cellulose ether is hydroxyethyl cellulose (HEC).

5. The fabric softening composition of claim 1, wherein the polyhydric alcohol is selected from: ethylene glycol, glycerin (glycerol), erythritol, threitol, arabitol, xylitol, ribitol, mannitol, sorbitol, galactitol, fucitol, iditol, inositol, volemitol, isomalt, maltitol, lactitol, maltotriitol, maltotetraitol, polyglycitol.

6. The fabric softening composition of claim 5, wherein the polyhydric alcohol is glycerin.

7. The fabric softening composition of claim 6, wherein the glycerin is present in an amount from 0.5%-3.0% by wt of the total composition.

8. The fabric softener composition of claim 1, wherein the hydrolyzed plant protein is selected from: hydrolyzed wheat gluten, almond flour hydrolysate, wheat protein fatty acid condensates, cationic wheat protein hydrolysates, hydrolyzed soybean protein, hydrolyzed pea protein, hydrolyzed rice protein, hydrolyzed almond flour, or combinations thereof.

9. The fabric softener composition of claim 8, wherein the hydrolyzed plant protein is cationic wheat protein.

10. The fabric softener composition of claim 9, wherein the cationic wheat protein is present in an amount of from 0.1% to 1% by wt of the total composition.

11. The fabric softener composition of claim 1, wherein the fabric softener comprises:

a. a natural thickener comprising hydroxyethyl cellulose;

b. a polyhydric alcohol comprising glycerin; and c. a plant-based softening agent comprising isopropyl palmitate.

12. The fabric softener composition of claim 1, wherein the fabric softener comprises:

a. a natural thickener comprising hydroxyethyl cellulose;

b. a polyhydric alcohol comprising glycerin; and c. a plant-based softening agent comprising a cationic wheat protein.

13. The fabric softener compositions of claim 1, further comprising etidronic acid.

14. The fabric softener compositions of claim 13, wherein the etidronic acid is present in an amount from 0.05% to 0.4% by wt. of the total composition.

15. The fabric softener composition of claim 1, wherein the plasticizer comprises isopropyl palmitate and is substantially free of a cationic wheat protein.

16. The fabric softener composition of claim 1, wherein the cloud point evaluation at cold temperatures results in clouding at temperatures as low as between −1° C. to −4.5° C.; wherein the viscosity of the softener is between 70-180 cps; wherein the softener has a phabrometer score above 3.0; or wherein the NTUs (Nephelometric Turbidity Units) is between 1.8-3.5.

17. A fabric softening composition comprising:

(i) a natural thickener comprising a nonionic cellulose ether;

(ii) a polyhydric alcohol:

(iii) a plant-based softening agent comprising one or more agents selected from:

a.) a plasticizer, wherein the plasticizer is further selected from the group consisting of isopropyl myristate, isopropyl palmitate, isodecyl neopentanoate, isodecyl oleate, and diisopropyl adipate, and wherein the plasticizer is present in an amount from 0.05% to 0.5% by wt of the total composition; or b.) a hydrolyzed plant protein obtained from grains of the family Poaceae; and (iv) lactic acid and etidronic acid; or lactic acid and capryl glycol.

* * * * *